June 27, 1944.    J. G. OETZEL    2,352,218
BRAKE
Filed April 4, 1941    3 Sheets-Sheet 1

INVENTOR
John George Oetzel
By Parker, Carlson, Pitzner & Hubbard
ATTORNEYS

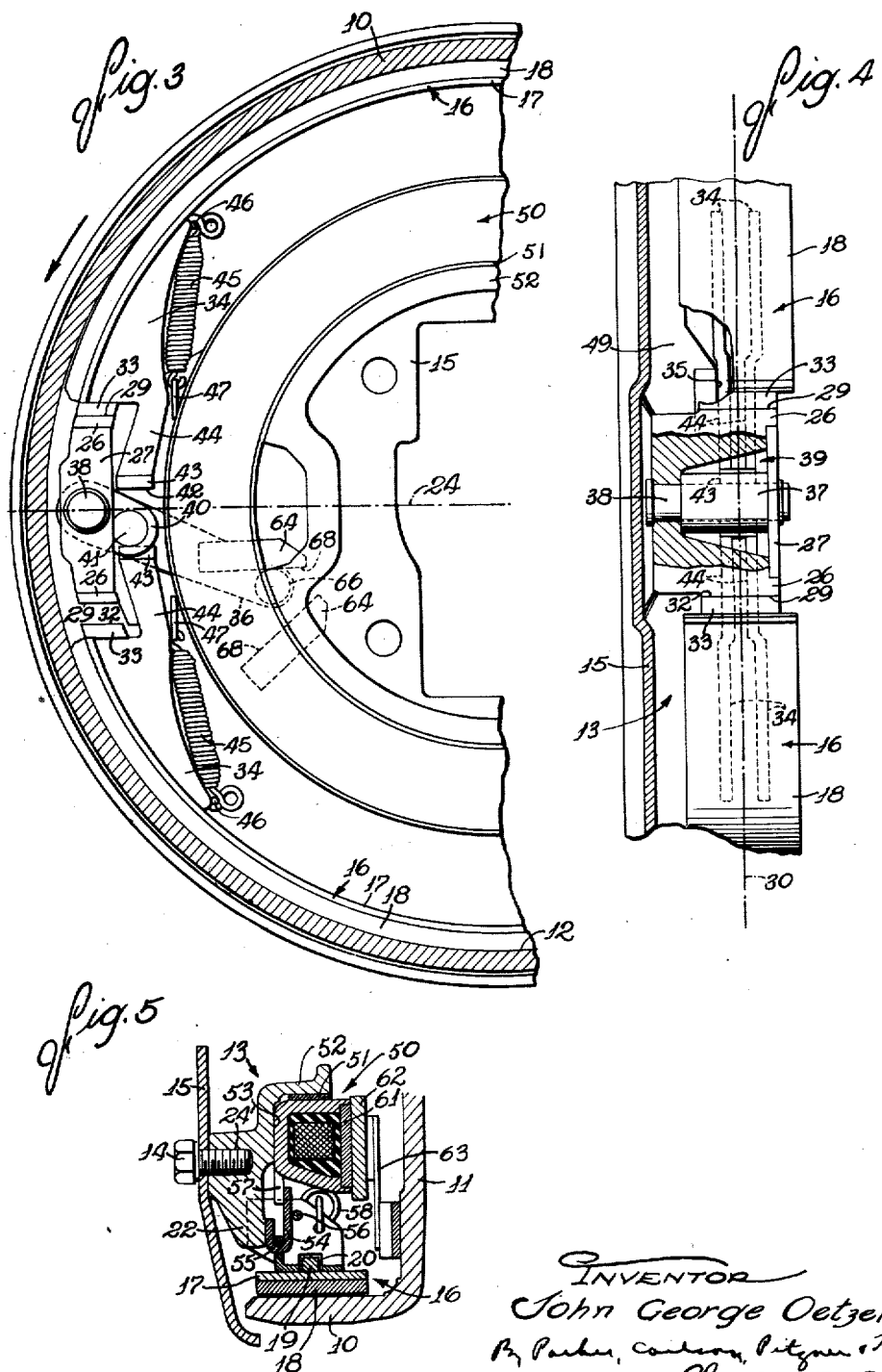

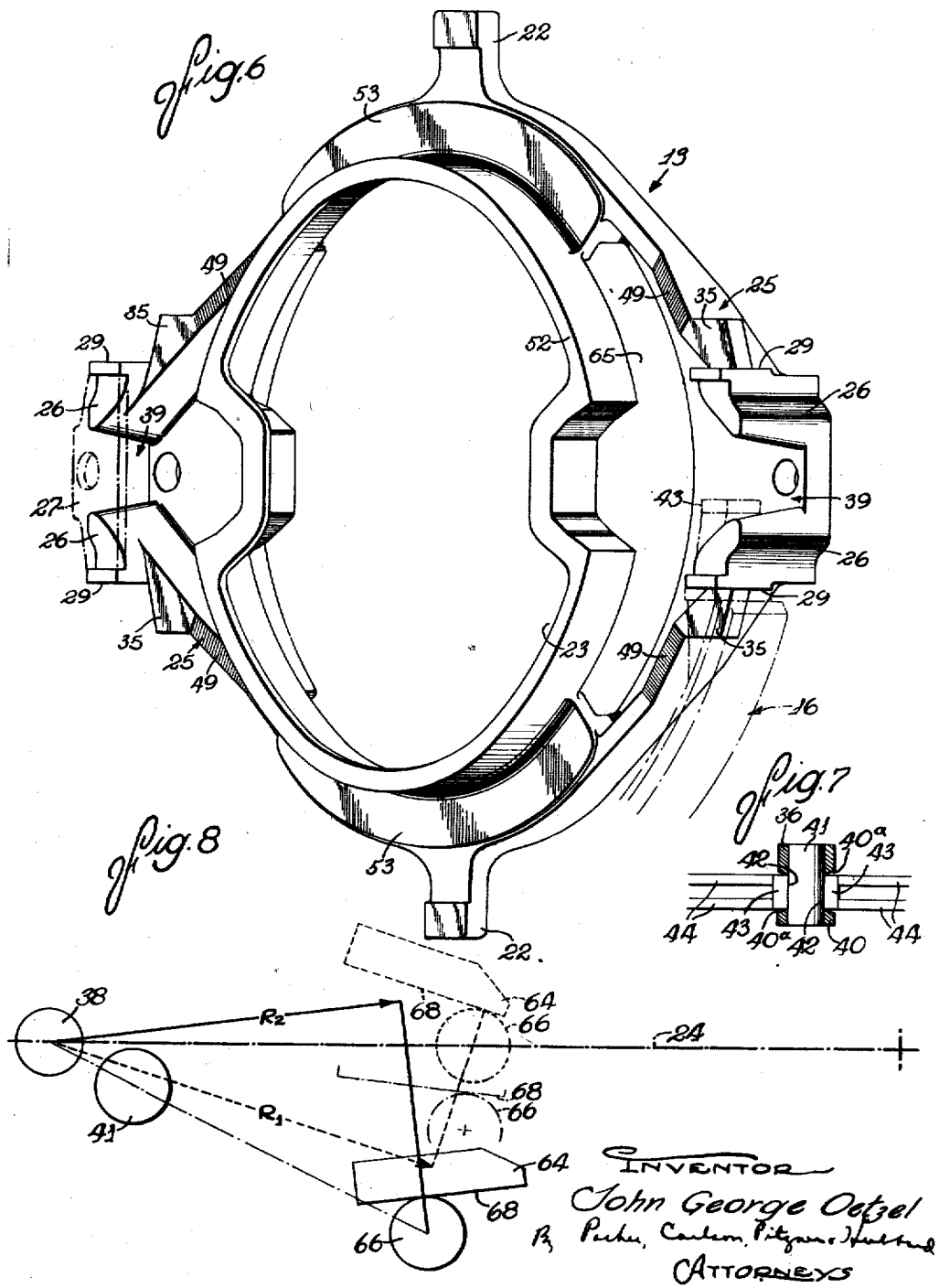

Patented June 27, 1944

2,352,218

UNITED STATES PATENT OFFICE 2,352,218

BRAKE

John George Oetzel, Beloit, Wis., assignor to Warner Electric Brake Manufacturing Company, South Beloit, Ill., a corporation of Illinois Application April 4, 1941, Serial No. 386,775

13 Claims. (Cl. 188—78)

This invention relates generally to friction brakes of the character used on automotive vehicles and, in certain of its aspects, has more particular reference to brakes of the so-called wrapping or self-energizing type.

One object is to provide a brake of the above general character in which the actuating and reactionary forces are applied to the actuated friction element in a novel manner so as to be balanced with respect to the longitudinal center line.

A more detailed object is to provide anchoring and actuating surfaces on the ends of the friction elements spaced both radially and circumferentially but both disposed in the plane of the center line of the element.

Another object is to provide a brake actuated by a so-called momentum operator through the medium of a novel mechanism by which the brake tends to remain set during reverse motion of the braked part so long as the momentum operator remains energized.

Still another object is to provide a novel anchor construction.

A further object is to provide a novel actuating mechanism.

Other objects and advantages of the invention will become apparent from the following detailed description taken in connection with the accompanying drawings, in which Figure 1 is an axial sectional view of a brake embodying the novel features of the present invention, the section being taken along the line 1—1 of Fig. 2.

Fig. 3 is a fragmentary view similar to Fig. 1 showing the elements in actuated positions.

Figure 1:
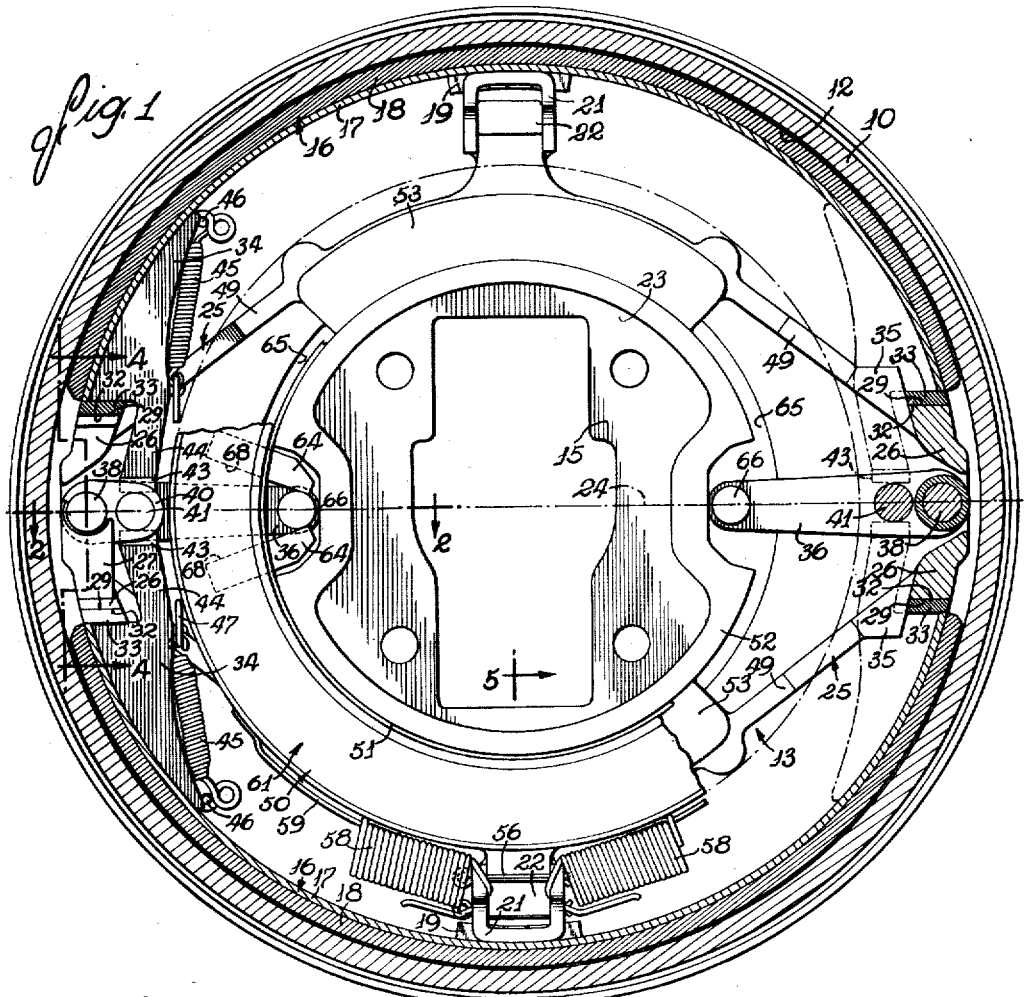

Figs. 4 and 5 are sections taken along the lines 4—4 and 5—5 of Fig. 1.

Fig. 6 is a fragmentary perspective view of the brake anchor member.

Figure 2:
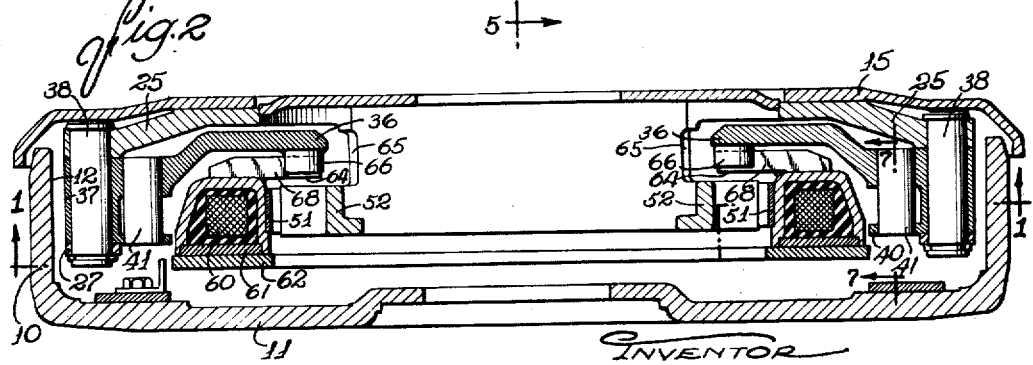
Fig. 2 is a section taken along the line 2—2 of Fig. 1.

Fig. 7 is a section taken along the line 7—7 of Fig. 2.

Fig. 8 is a diagram showing the parts of the transmitting connection and the forces acting thereon in different positions.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The brake shown for purposes of illustration is of the internal expanding type comprising a drum 10 with an inturned flange 11 bolted to the vehicle wheel or other part to be braked and having an internal cylindrical surface 12 adapted to be gripped by a non-rotatable friction element supported by an anchor member indicated generally at 13 and secured by a means such as bolts 14 to a plate 15 which closes the open end of the drum and is carried by an axle housing or other non-rotatable part.

In the present instance, the friction element comprises two semi-circular shoes 16 either flexible or rigid and arranged in end to end relation within the drum. As shown, each shoe comprises a curved band 17 having a segment 18 of suitable friction material riveted or otherwise secured to its outer surface. Elongated lugs 19 welded along the center line of the shoe bands 17 are received in guide notches 20 on brackets 21 which are rigid with lugs 22 on the anchor member 13. Thus, the shoe is held against lateral movement but is guided longitudinally during expansion of the shoes within the drum.

In the form shown, the anchor member 13 comprises a ring-like steel casting with a central aperture 23 adapted to fit over the axle and with holes 24' through which the bolts 14 may be entered. The lugs 22 project radially from opposite sides of the ring. Along a diameter 24 at right angles to the lugs 22 are two arms 25 converging outwardly to points adjacent the internal drum surface and lying adjacent the plate 15 so as to be offset laterally from the longitudinal center line 30 of the shoes 16. Integral with and projecting laterally from the ends of the arm 25 are spaced lugs 26 rigidly connected at their free ends by a separate bar 27 welded to the lugs.

The oppositely facing flat outer sides 29 of the lugs are disposed parallel to the diameter 24 and constitute anchor abutments engageable with the flat surfaces 32 on hardened blocks 33 on the ends of the brake shoes. The latter blocks are welded to the ends of the shoe bands 17 and the ends of tapering bracket plates 34 which are welded along the inner surfaces of the bands and disposed on opposite sides of the center line 30. The brackets nearest the anchor member 13 lie against flanges 35 which thus serve as guides for the shoe ends in the movement of the latter toward and away from their anchors. As a result, the reactionary force applied to the anchored end of the shoe is always balanced with respect to the shoe center line.

Either of the adjacent shoe ends may be moved circumferentially away from its anchor to apply the brake, the line of action of the actuating force also being balanced with respect to the shoe center line. Herein this actuating means comprises a crank 36 having a hub 37 pivoted adjacent the drum surface on a pin 38 which is disposed in the recess 39 between the anchor lugs and projects through the anchor arm 25 and the plate 27 by which the hub is held against endwise movement. The free end of the crank is disposed to one side of the brake shoes. On the other side of the shoe and integral with the hub 37 is an arm 40 which receives with a press fit one end of a hardened pin 41 projecting parallel to the crank axis with its other end supported by the crank proper. The pin thus provides arcuate surfaces adapted for rolling contact with the surfaces 42 of hardened blocks 43 on the ends of extensions 44 of the shoe brackets 34, these surfaces 42 extending parallel to the drum diameter 24. Preferably, the edges of the cranks 36 and the arms 40 are beveled as indicated at 40ª (Fig. 7) and coact with the shoe ends 43 to perform the additional function of guiding these ends into accurately defined lateral positions as the shoes are contracted. The possibility of incomplete return of the parts to fully released position due to misalinement of the parts is thus avoided and the anchored shoe end is always maintained properly centered relative to the shoe center line.

The extensions 44 project beyond the anchor surfaces 29 and lie inside of the stops 26. By thus spacing the anchor and actuating surfaces 29 and 42 of the shoes both radially and circumferentially of the drum, the areas of contact with the surfaces 29 and the pin 41 are balanced with respect to the center line of the shoes and there is no twisting tendency during application of the brake. Coiled contractile springs 45 stretched between pins 46 connecting the shoe brackets 34 and lugs 47 on the anchor member 13 urge the shoe ends toward the brake-released position in which the crank 36 is disposed radially and the surfaces 29 and 42 on each shoe end are in abutment with the lugs 26 and the pin 41 as shown in Fig. 1.

To reinforce the anchor member 13, ribs 49 are formed integral with the latter along edges of the arms 25. These are located so as to permit ample movement of the cranks 36 in actuating the brakes.

While the cranks 36 may be actuated in various ways, a power operator of the momentum type is employed in the present instance. As shown, the operator includes an annular magnetic ring 50 concentric with the drum axis and mounted to oscillate on a bushing 51 supported by a flange 52 on the anchor member 13. The magnet lies in the plane of the brake shoes and is held loosely against a backing surface 53 (Fig. 5) on the anchor member by a spring clip 54 supported by pins 55 and 56 on the brackets 21 and overlapping a lug 57 projecting outwardly from the magnet. Oppositely acting contractile springs 58 stretched between the brackets 21 and elongated eyes 59 on the magnet urge the latter circumferentially toward brake-released position while permitting of movement in either direction away from this position. The magnet is energized by a winding 60 disposed between inner and outer poles which terminate faces substantially flush with the surface of segments 61 of friction material supported between the poles. The magnet coacts with a flat armature ring 62 supported from the drum flange 11 through the medium of tangentially extending spring arms 63 which constantly urge the armature into light mechanical contact with the magnet face.

Rigidly secured to the back of the magnet as by welding are two pairs of lugs 64 disposed in recesses 65 between the flange 52 and the arms 25 of the anchor member 13 and projecting inwardly toward the drum axis. Between the lugs of each pair is a hardened pin 66 rigid with and projecting laterally from the free end of the crank 36 which lies behind the magnet. It will be observed that the engaging surfaces 68 of the lugs 64 converge inwardly toward each other and the diameter 24, so that as the pin moves out along its actuating lug in applying the brake, the actuating force will continue to be applied perpendicular to the crank arm.

One purpose of this is to compensate for the decrease in the effective moment arm of the actuating force which would occur as the crank 36 moves away from released position if the surfaces 68 were disposed parallel to the diameter 24 in the brake-released position. The direction of the force applied by the surface 68 to the pin 66 being normal to the surface, it will be observed from Fig. 8 that the moment arm $R_1$ of the force when the brake is released is shorter than the radial spacing of the centers of the pins 38 and 66. The length of the moment arm increases progressively until the pin 66 reaches the position shown in dot-dash outline after which the length of the arm decreases progressively. In the position shown in full lines, the moment arm has decreased to a value $R_2$. By thus varying the effective moment arm of the actuating force, the loss of leverage incident to the crank movement is reduced to a negligible value.

Energization of the magnet winding 60 produces a proportional gripping engagement between the rotating armature and the friction face of the magnet ring causing the magnet to turn with the armature. This movement is communicated through one lug 64 of each pair to the pins 66 which ride outwardly along the lugs as the free ends of the crank arms 36 move with the magnet. The lugs, since they project from the lever pivot in the same direction as the crank arms, move in the direction of drum rotation and shift one end of each shoe away from its anchor depending on the direction of drum rotation (see Fig. 3). This results in expansion of the shoes and initiation of the self-energizing action to create a powerful braking effect in the manner described above. After the clearance between the shoes and the drum has been taken up, slippage occurs between the magnet and armature faces until the wheel stops revolving, the brake being held set so long as the magnet remains energized. When the magnet winding is deenergized, the springs 45 and 58 coact to return the shoes and the magnet to released position.

With the brake shoes mounted and actuated in the manner above described, it will be observed that only one end of each shoe will be actuated while the other end anchors. As a result, each shoe constitutes the seat of a self-energizing action which builds up through only half of the drum circumference and therefore is maintained within controllable limits. Both the actuating and reactionary forces incident to application of the brake are, by virtue of the radial and circumferential spacing of the anchoring and actuating surfaces 29 and 32, directed in the plane of the shoe center so that the position of the shoes relative to the drum is maintained accurately.

I claim as my invention:

1. A brake having, in combination, a rotatable drum, an expansible friction element extending around the internal drum surface and having inner and outer surfaces on its ends spaced apart both radially and circumferentially of the drum with the inner surfaces on the different ends disposed generally radially and closer together than the outer surfaces, anchoring means abutting against said outer surfaces, a crank swingable about a fixed pivot disposed between said outer surfaces outwardly beyond said inner surfaces and adjacent said drum surface, and surfaces on opposite sides of said crank intermediate the ends thereof facing circumferentially in opposite directions and engageable with either of the inner end surfaces one at a time to move such end circumferentially of the drum and away from its abutment.

2. A brake having, in combination, a rotatable drum, an expansible friction element extending around the internal drum surface and having its ends spaced apart on one side of the drum, each of said ends having two end surfaces spaced apart both radially and circumferentially of the drum and disposed substantially radially and in the plane of the center line of said element, anchoring means engageable with one surface on each of said ends, a fixed pivot extending parallel to the drum axis, an arm swingable on said pivot and projecting inwardly between said ends, and circumferentially facing side surfaces on opposite sides of said arm engageable selectively with one or the other of said other element surfaces to move the latter circumferentially away from said anchoring means when said arm is swung away from brake-released position, said pivot being disposed adjacent said drum surface outwardly beyond the points of engagement between said ends and said surfaces.

3. A brake having, in combination, a rotatable drum, an expansible friction element extending around the internal drum surface and having its ends spaced apart on one side of the drum, each of said ends having two end surfaces spaced apart both radially and circumferentially of the drum and disposed substantially radially and in the plane of the center line of said element, anchoring abutments engageable with one surface on the respective ends, a crank pivoted adjacent said drum surface to turn on a fixed axis and projecting inwardly, said crank having side surfaces facing circumferentially in opposite directions and disposed equidistant from the drum axis and adjacent the other of said end surfaces, and means for swinging said crank in one direction or the other away from centered position to cause bearing engagement between one of said side surfaces and the corresponding end surfaces of said element and circumferential movement of the engaged element surface away from its abutment, said fixed pivotal axis being disposed outwardly beyond the points of engagement between said end and side surfaces.

4. A brake having, in combination, a rotatable drum, a non-rotatable anchor member providing a hollow stop adjacent the internal drum surface having side walls spaced apart axially of said drum and end walls spaced circumferentially, the outer surfaces of said end walls providing oppositely facing abutments, expansible friction means extending around said drum and having end portions disposed on opposite sides of said arm with abutment surfaces normally contracted against said stop abutments, an inwardly projecting crank arm having a fixed pivot extending between and supported by said side walls, actuating means engageable with the free inner end of said crank arm, and extensions of said shoe ends projecting toward each other and past said stop abutments with their ends abutting said crank arm inwardly from its pivot, the areas of engagement between said abutments, said abutment surfaces, said extensions and said crank arm being disposed on the longitudinal center line of said friction means whereby the actuating and reactionary forces are balanced with respect to such line.

5. A brake having, in combination, a rotatable drum, a friction element engageable with the internal drum surface and having ends spaced apart on one side of the drum, an anchor member projecting outwardly to a point adjacent said surface and being offset laterally from the center line of said element, circumferentially spaced lugs projecting laterally from said member and providing stops abutting against said ends alined with the center of said element, a bar rigidly connecting the projecting ends of said lugs, and means for expanding said element comprising a device engageable with an end of said element in the plane of the center line thereof and swingable on a pivot supported by said member and said bar and disposed between said lugs.

6. A brake having, in combination, a rotatable drum, a friction element engageable with the internal drum surface and having ends spaced apart on one side of the drum, an anchor member projecting outwardly to a point adjacent said surface, circumferentially spaced lugs projecting laterally from said member and providing abutments engageable with said ends, a bar connecting the free ends of said lugs, a pivot disposed between said lugs and supported at opposite ends by said member and said bar, and expanding means for said element mounted on said pivot.

7. A brake having, in combination, a rotatable drum, a friction element engageable with the internal drum surface and having ends spaced apart on one side of the drum, an anchor member having an arm projecting outwardly to a point adjacent said surface and being offset laterally from the center line of said element, circumferentially spaced lugs projecting laterally from said arm and providing stops abutting against said ends, a crank pivotally supported by said arm between said lugs and swingable parallel to the arm, means on said crank engageable with an end of said element to apply an expanding force thereto, and reinforcing ribs extending along the edges of said arm beyond the normal range of oscillation of said crank.

8. A brake having, in combination, a rotatable drum, a friction element engageable with the internal drum surface and having ends spaced apart on one side of the drum, an anchor abutting one of said ends in the plane of the center line of the element, a crank swingable about an axis between said ends and parallel to the drum axis and having two arms disposed on opposite sides of said plane, means extending between said arms and providing an arcuate surface having bearing engagement in said plane with the other of said ends, and means for actuating said crank to expand said element.

9. A brake having, in combination, a rotatable drum, a friction element engageable with the internal drum surface and having ends spaced apart on one side of the drum, an anchor abutting one of said ends in the plane of the center line of the element, a crank swingable about an axis between said ends and parallel to the drum axis and having two arms disposed on opposite sides of said plane, means extending between said arms and providing an arcuate surface having bearing engagement in said plane with the other of said ends, means for actuating said crank, and edge surfaces on said arms coacting with the edges of said actuated end to guide the latter in between the arms in returning to brake-released position.

10. A brake having, in combination, a rotatable drum, an expansible friction element extending around the internal drum surface with its ends disposed adjacent each other, each of said ends having two circumferentially facing abutments thereon, a member disposed between and engageable with the two outer abutments on the respective element ends to anchor one of said ends or the other depending on the direction of rotation of said drum when said element is expanded, the engaging surfaces of said member and abutments being shaped to permit freedom of outward radial movement of the end while anchored against said member, an inwardly projecting arm swingable in opposite directions about a fixed axis disposed between said ends and extending parallel to the drum axis, means rigid with said arm and disposed between said other two abutments for circumferential engagement with one or the other thereof depending on the direction of movement of the arm away from normal brake-released position, the other element end remaining fixed against said member, and actuating means for moving the inner end of said arm selectively in either direction corresponding to the direction of rotation of said drum, said axis being disposed outwardly beyond the points of engagement between said arm and the abutments engaged thereby.

11. A brake having, in combination, a rotatable drum having an internal cylindrical surface, an anchor disposed adjacent one side of said surface, an expansible friction element extending around said surface and having its ends urged into abutment with said anchor and shaped for freedom of radial movement relative to the anchor while engaging the latter, a pivot parallel to said drum axis between said ends and adjacent said drum surface, a crank arm swingable on said pivot and projecting radially and inwardly therefrom, said crank having side surfaces intermediate its ends facing circumferentially in opposite directions and spaced inwardly from said pivot equidistant from the drum axis, substantially parallel radially disposed surfaces on said element ends disposed adjacent and engageable with said side surfaces, said pivot being fixed relative to said anchor and disposed outwardly beyond the points of engagement between said side surfaces and said abutment, and means connected to the inner end of said crank arm and operable to swing the crank in one direction or the other away from brake-released position whereby to move one of said element surfaces circumferentially away from said anchor while the other element end remains against said anchor.

12. A brake having, in combination, a rotatable drum having an internal cylindrical surface, a fixed pivot extending parallel to the axis of said drum and disposed closely adjacent said surface, an anchor member disposed adjacent said surface and having abutments spaced circumferentially from the surface of said pivot on opposite sides thereof and facing circumferentially in opposite directions, an expansible friction element extending around said surface and having its ends urged against the respective abutments and free to move outwardly therealong, a crank arm swingably supported on and projecting radially and inwardly from said pivot, said crank having side surfaces facing circumferentially in opposite directions and spaced inwardly from said pivot and equidistant from the drum axis, substantially parallel radially disposed surfaces on said element ends disposed adjacent and engageable with said side surfaces, said pivot being disposed outwardly beyond the points of engagement between said crank and said element, and actuating means engageable with said crank inwardly from said crank surfaces and operable to swing the crank in one direction or the other away from brake-released position depending on the direction of drum rotation whereby to move one of said element surfaces circumferentially away from said anchor while the other element end remains against said anchor.

13. A brake having, in combination, a rotatable drum, an expansible friction element extending around the internal drum surface with its ends disposed adjacent each other and spaced circumferentially, a hollow non-rotatable member disposed between said ends and providing abutments for anchoring one or the other of the ends, a pivot disposed within said hollow anchor member and fixedly supported thereby, a crank arm swingable on said pivot with its free end projecting radially and inwardly from said member, and surfaces on the sides of said crank arm engageable with said ends to move one or the other end away from said member.

JOHN GEORGE OETZEL